United States Patent [19]
Homma

[11] Patent Number: 5,504,740
[45] Date of Patent: Apr. 2, 1996

[54] LINE TRUNK UNIT CONNECTED TO A TIME DIVISION SWITCH, DIGITAL EXCHANGE AND COMMUNICATIONS SYSTEM USING THE LINE TRUNK UNIT

[75] Inventor: Masahiro Homma, Kawasaki, Japan

[73] Assignee: Fujitsu Limited, Kanagawa, Japan

[21] Appl. No.: 189,161

[22] Filed: Jan. 28, 1994

[30] Foreign Application Priority Data

Feb. 12, 1993 [JP] Japan ................................ 5-024208

[51] Int. Cl.⁶ .................................................... H04J 3/12
[52] U.S. Cl. ......................... 370/58.2; 370/68.1; 379/229
[58] Field of Search ........................... 370/56, 58.1, 58.2, 370/58.3, 66, 67, 68, 68.1, 85.1, 85.9, 85.11, 110.1, 112; 379/229, 231, 232, 240, 334

[56] References Cited

U.S. PATENT DOCUMENTS

| | | | |
|---|---|---|---|
| 4,689,783 | 8/1987 | Kaczerowski | 370/56 |
| 4,694,452 | 9/1987 | Beckinger et al. | 370/110.1 X |
| 4,815,072 | 3/1989 | Linda et al. | 370/58.1 X |

FOREIGN PATENT DOCUMENTS 61-269498  11/1986  Japan.

*Primary Examiner*—Melvin Marcelo

[57] ABSTRACT

In a line trunk unit which is connected to a digital private branch exchange and can accommodate lines connectable to communications terminals or a network, a first interface unit establishes an interface between multiplexed highways coupled to the digital private branch exchange and a predetermined number of demultiplexed highways in the line trunk unit. A second interface unit communicates with a remote unit accommodating a communications terminal via a transmission line and communicates with a control unit of the digital private branch exchange via at least one of the demultiplexed highways, the control unit controlling a switch of the digital private branch exchange.

18 Claims, 19 Drawing Sheets

LINE TRUNK UNIT CONNECTED TO A TIME DIVISION SWITCH, DIGITAL EXCHANGE AND COMMUNICATIONS SYSTEM USING THE LINE TRUNK UNIT

BACKGROUND OF THE INVENTION

1. Field of the Invention

The present invention relates to a digital exchange such as a digital PBX (Private Branch exchange), and more particularly to control of a highway forming a communications path of a digital PBX.

2. Description of the Prior Art

In a digital exchange such as a digital PBX, a communications path for transferring voice and data signals is generally called a highway.

FIG. 1 shows a conventional digital PBX of a distributed control type. The digital exchange shown in FIG. 1 includes a time division switch SW, a plurality of line trunk (accommodating) units LTU0 through LTUn, and a control unit CU. Each of the line trunk units LTU0–LTUn includes a plurality of line trunk packages LT0–LT15, and is accommodated in a frame of the digital PBX. The line trunk packages LT0–LT15 control line processors LPR0–LPR15, respectively. The line trunk packages LT0–LT15 accommodate lines connected to telephone sets or public networks. Each of the line trunk packages LT0–LT15 accommodates 16 lines. The line trunk units LTU0–LTUn are connectable to the time division switch SW via the highways HW.

Data transferred via the highway HW is formed as shown in FIG. 2, which shows the format of data on the highway HW connecting the time division switch SW and one line trunk unit LTU to each other. As shown in FIG. 2, the data includes a plurality of frame units F0–F32. One frame includes 32 time slots TS0–TS31. One time slot consists of eight bits B7–B0.

The bit rate of a data transfer via a conventional digital PBX using a sampling frequency of 8 kHz and eight quantization bits is 64 kbps (=8 kHz×8 bits). When data (equal to eight bits) per subscriber is represented by one time slot, one frame corresponds to a synchronizing frequency of 8 kHz (=125 μs), and one frame consists of 32 time slots, then one time slot is as follows:

$$1TS = 125 \text{ μs } (1F)/32 \approx 3.9 \text{ μs}.$$

Each of the eight bits B7–B0 in one time slot is as follows:

$$1 \text{ bit} = 3.9 \text{ μs}/8 \approx 488 \text{ ns} = 2.048 \text{ MHz}.$$

Normally, the data transfer direction in which data is transferred from the line trunk package LT to the time division switch SW via the highway HW is called the up-transfer direction, and the data transfer direction in which data is transferred from the time division switch SW to the line trunk package LT via the highway HW is called the down-transfer direction. Each of the line trunk units LTU0–LTU15 (n=15) simultaneously handles a plurality of highways HW.

FIG. 3 shows the structure of the line trunk unit LTU0. In FIG. 3, the line trunk packages LT0–LT15 shown in FIG. 1 are omitted. The line trunk unit LTU0 includes an interface HWINF having multiplexer/demultiplexer units (MPX/DMPX) 10 and 12. Symbols HW0–HW7 indicate highways for transferring speech data, and symbol HWC indicates a highway for transferring communications data. A set of highways HW0–HW7 and HWC is provided for the up-transfer direction, and another set of highways HW0–HW7 and HWC is provided for the down-transfer direction. The communications data includes a variety of control data used for the distributed control of the digital PBX.

The interface HWINF establishes an interface between the time division switch SW and the line trunk unit LTU0. The MPX/DMPX unit 10 performs a multiplexing/demultiplexing process for highways. The MPX/DMPX unit 12 performs a multiplexing/demultiplexing process for the highways HW0 and HWC. Dots shown in FIG. 3 denote points (contacts) used in slots for accommodating the line trunk packages LT0–LT15, these points being formed in the frame of the digital PBX. Slender blocks including points denote slots (LT) for accommodating the packages, these slots being provided in the frame of the digital PBX. The structure shown in FIG. 3 has 16 slots 0–15. For example, line trunk packages to be inserted into slots 0 and 1 share the highway HW7, that is, 32 time slots formed on the highway HW7. The communications data highway HWC utilizes a part of the speech data highway HW0, and is shared by the 16 slots.

Returning now to FIG. 1, the time division switch SW includes a multiplexer (MPX) 21, a speech path memory (SPM) 22, and a demultiplexer (DMPX) 23. The multiplexer 21 multiplexes data transferred via the highways HW from the line trunk units LTU0–LTU15 and communications data from a control unit CU, which will be described later, and output multiplexed data to the speech path memory 22. Under the control of the control unit CU, the speech path memory 22 performs a switching operation in which the time slots are switched. The demultiplexer 23 performs a distributing process for data read from the speech path memory 22, and transmits the read data to the line trunk units LTU0–LTU15 via the highways HW. Further, the demultiplexer 23 outputs the communications data to the control unit CU.

The control unit CU controls switching of the time division switch SW and controls the transmitting and receiving operations on communications data (control data) transferred between the control unit CU and the line processors LPR0–LPR15. The control unit CU includes a call processor CPR, a communications data buffer memory (signaling memory) SM, a speech path memory controller CTL, and a processor bus PB connecting these structural parts. The call processor CPR performs control for communicating with the line trunk units LTU0–LTU15 and a maintenance operation thereon. The speech path memory controller CTL controls the speech path memory 22. The communications data buffer memory SM is used to hold the communications data.

More particularly, the communications data buffer memory SM includes a send buffer memory SSM and a receive buffer memory RSM. The send buffer memory SSM holds communications data transferred in the down-transfer direction (in which the communications data is transferred from the time division switch SW to the line trunk units LTU). The receive buffer memory RSM holds communications data transferred in the up-transfer direction (in which the communications data is transferred from the line trunk units LTU to the time division switch SW).

FIG. 4 is a diagram of the structures of the send buffer memory SSM and the receive buffer memory RSM. Each of the send buffer memory SSM and the receive buffer memory RSM has buffer areas respectively assigned to the line trunk units LTU0–LTU15 (n=15). Each of the buffer areas has buffer areas respectively assigned to the line processors LPR0–LPR15. When one-byte communications data is used per one line processor LPR, areas equal to 16 bytes in total are permanently allotted in advance in each of the send buffer memory SSM and the receive buffer memory RSM.

For example, the communications data from a line processor LPR of the line trunk unit LTU0 is transferred via the communications data highways HWC which is a part of the aforementioned speech data highway HW0, and is input to the multiplexer 21 in which the input communications data is multiplexed with other data. Under the control of the speech path memory controller CTL, the speech path memory 22 switches the time slots, and writes the above-mentioned communications data into the corresponding area in the receive buffer memory RSM. The communications data to a line processor LPR of the line trunk unit LTU0 is written into the corresponding buffer area in the send buffer memory SSM under the control of the call processor CPR, and is then multiplexed with other data by the multiplexer 21. Then, the communications data is subjected to the process for switching time slots in the speech path memory 22, and is demultiplexed by the demultiplexer 23. Then, the demultiplexed communications data is transferred to the call processor CPRF.

However, the above-mentioned conventional communications system has a disadvantage caused by the structure in which one line trunk unit LTU handles a fixed number of highways. For example, in the structure shown in FIG. 15, one line trunk unit LTU can handle eight highways. This is due to the fact that the system structure needs a predetermined number of line processors LPR which can be accommodated in one line trunk unit LTU.

As shown in FIG. 3, when the line trunk unit LTU0 is designed to handle eight highways HW at most, 16 slots capable of accommodating 16 line processors LPR are provided in the frame of the digital PBX. Hence, although all of the 16 slots may be used in the future, the system structure is not efficiently utilized if a smaller number of slots are initially used at present. In this case, the space for placing the digital PBX is not efficiently used.

The above problems are particularly serious in the following case.

Generally, in the communications system shown in FIG. 1, the lines connecting the line trunk units LTU to the terminals and the public networks are metallic lines, which can be allowed to extend 1 km at most without any repeater. With the above in mind, use of a remote line control system has been proposed.

FIG. 5 is a block diagram of a conventional digital PBX using a remote line control system. In FIG. 5, parts that are the same as those shown in FIG. 1 are given the same reference numbers as previously. As shown in FIG. 5, a remote unit RU is substituted for the line trunk unit LTU0, and a remote interface unit RIF for connecting the time division switch SW and the remote unit RU via a transmission line is provided at the side of the digital PBX. The remote unit RU and the remote interface unit RIF are control devices for extending the distance of highways (transmission line), and allows the transmission line to extend to a length allowed by the transmission line interface. In practice, it is possible to form a transmission line tens of kilometers in length.

The remote unit RU includes a remote unit controller RUCTL having line trunk packages LT0–LT15, which respectively establish interfaces with the transmission line. As has been described previously, the number of slots (highways) in the line trunk unit LTU is fixed, and a predetermined number of slots (16 slots in the example shown in FIG. 3) is mounted irrespective of how many slots are actually in use. Similarly, the number of slots (highways) in the remote unit RU placed in a remote place is fixed. Hence, a predetermined number of slots (16 slots corresponding to eight highways in the example shown in FIG. 3) is provided in the remote unit RU irrespective of how many slots are in use.

Even if the number of slots provided in the remote unit RU is reduced, the number of highways allotted to the remote unit RU is not changed. Hence, there are highways which are not used and the system cannot operate effectively.

SUMMARY OF THE INVENTION

It is an object of the present invention to provide a line trunk unit connected to a time division switch, a digital exchange and a communications system using the line trunk unit.

A more specific object of the present invention is to realize control on a highway-by-highway basis whereby efficient use of highways and structural parts of a digital exchange system becomes possible.

The above objects of the present invention are achieved by a line trunk unit which is connected to a digital private branch exchange and can accommodate lines connectable to communications terminals or a network, the line trunk unit comprising: first interface means for establishing an interface between multiplexed highways coupled to the digital private branch exchange and a predetermined number of demultiplexed highways in the line trunk unit; and second interface means for communicating with a remote unit accommodating a communications terminal via a transmission line and for communicating with a control unit of the digital private branch exchange via at least one of the demultiplexed highways, the control unit controlling a switch of the digital private branch exchange.

The above objects of the present invention are also achieved by a digital private branch exchange comprising: switch means for switching time slots on multiplexed highways for transmitting multiplexed data; line trunk units which are connected to the multiplexed highways and can accommodate lines connectable to terminals or a network; and control means for controlling communications with the line trunk units, at least one of the line trunk units comprising: first interface means, connected to one of the multiplexed highways, for establishing an interface between the above one of the multiplexed highways and a predetermined number of demultiplexed highways in the above one of the line trunk units; and second interface means for communicating with a remote unit accommodating a communications terminal via a transmission line and for communicating with a control unit of the digital private branch exchange via at least one of the demultiplexed highways, the control unit controlling a switch of the digital private branch exchange.

The above-mentioned objects of the present invention are also achieved by a communications system comprising: a network; and a digital private branch exchange, the digital private branch exchange comprising: switch means for switching time slots on multiplexed highways for transmitting multiplexed data; line trunk units which are connected to the multiplexed highways and can accommodate lines connectable to terminals or the network; and control means for controlling communications with the line trunk units, at least one of the line trunk units comprising: first interface means, connected to one of the multiplexed highways, for establishing an interface between the above one of the multiplexed highways and a predetermined number of demultiplexed highways in the above one of the line trunk units; and second interface means for communicating with a remote unit accommodating a communications terminal via a transmission line and for communicating with a control unit of the digital private branch exchange via at least one of said demultiplexed highways, the control unit controlling a switch of the digital private branch exchange.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 6A:
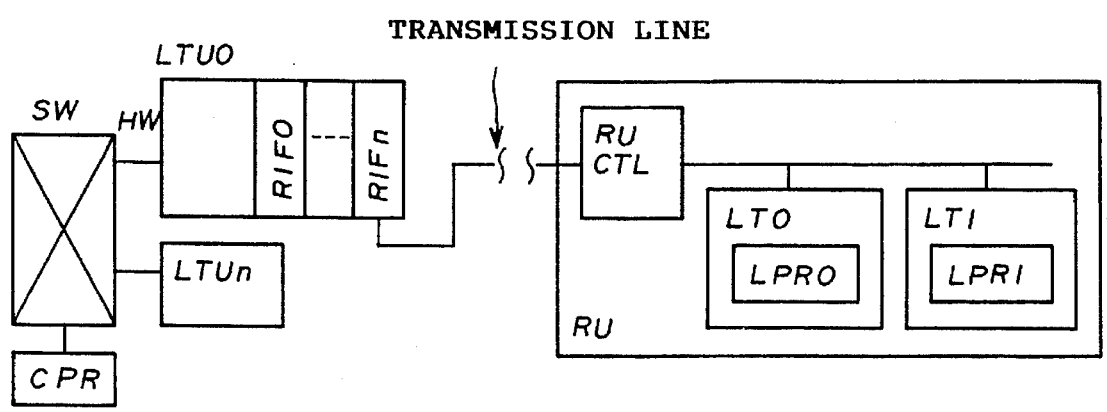
FIGS. 6A and 6B are block diagrams showing the principle of the present invention.
Figure 6B:
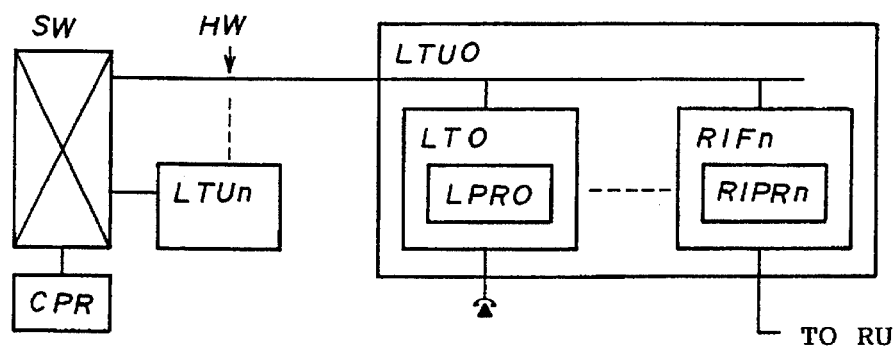

FIGS. 6A and 6B are diagrams of the principle of the present invention.

As shown in FIG. 6A, a line trunk unit LTU0 connected to a time division switch SW includes one or a plurality of remote interface units RIF0–RIFn. The line trunk unit LTU0 is equipped with a predetermined number of highways (in other words, slots into which packages are inserted), one or a plurality of remote interface units RIF are inserted into one or some slots among the above slots of the line trunk unit LTU0. As shown in FIG. 6B, the remote interface unit RIFn has a remote interface processor RIPRn for controlling the transmission line. Hence, within the line trunk unit LTU0, the remote interface unit RIF is handled in the same manner as the line trunk package LT0 equipped with the line control processor LPR0 shown in FIG. 1.

A remote unit RU is connected to the remote interface unit RIFn via the transmission line. Now assuming that two slots are allotted per highway, the remote interface RU is capable of accommodating two line trunk packages LT0 and LT1. The line trunk packages LT0 and LT1 are connected to the transmission line via a remote unit controller RUCTL.

Although not shown in FIG. 6A for the sake of simplicity, remote units RU are connected to the other remote interface units such as RIF0. As shown in FIG. 6B, the slots other than a slot into which a remote interface unit RIF is inserted can accommodate line trunk packages such as LT0.

Data transmitted from the digital PBX including the switch SW to the remote unit RU is output to the transmission line via the switch SW and the remote interface unit RIFn accommodated in the line trunk unit LTU0. The remote unit controller RUCTL of the remote unit RU sends the received data to the line trunk packages LT0 and LT1. Data from either the line trunk package LT0 or the line trunk package LT1 is transmitted to the digital PBX via the route reverse to the above-mentioned route.

With the above structure, it becomes possible to control a plurality of highways one by one and to provide one remote unit per highway. Hence, it becomes possible to efficiently utilize highways and the structural parts of the overall system.

Figure 1:
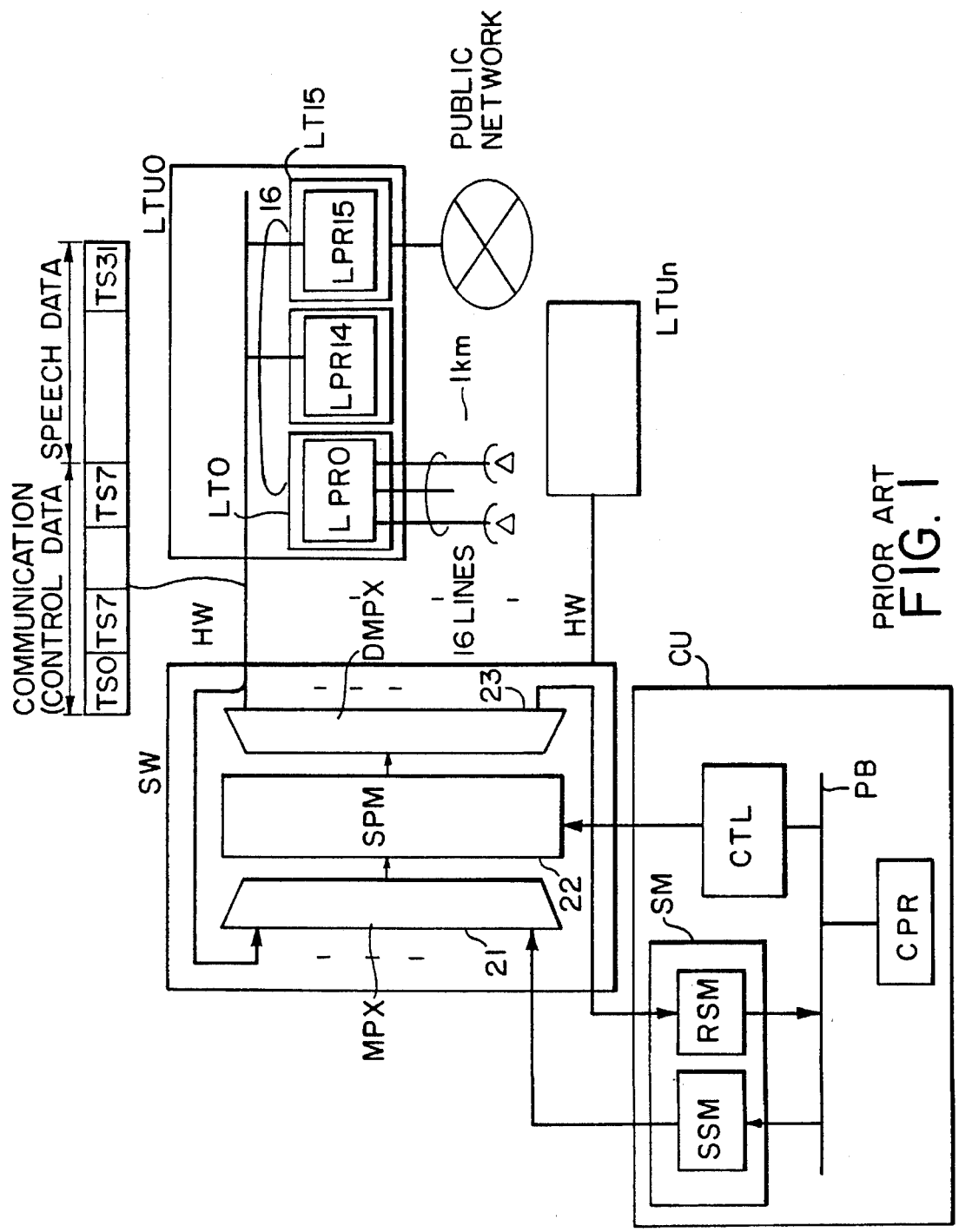
FIG. 1 is a block diagram of a communications system using a conventional digital PBX.
Figure 2:
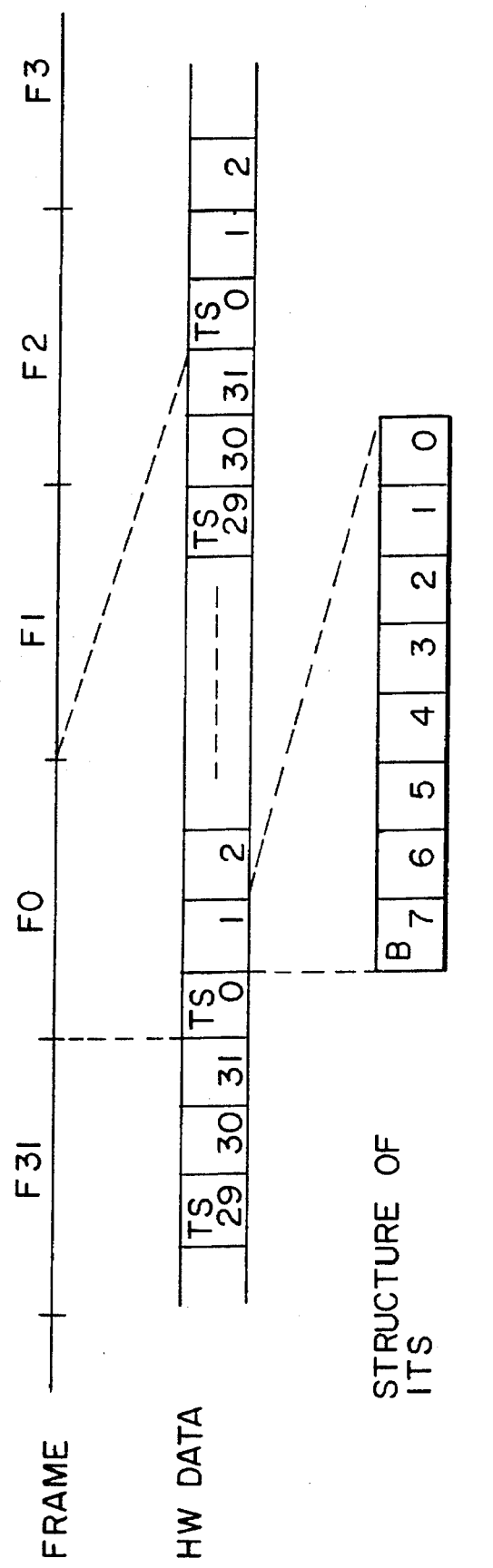
FIG. 2 is a diagram showing the format of data transferred via a highway shown in FIG. 1.
Figure 7:
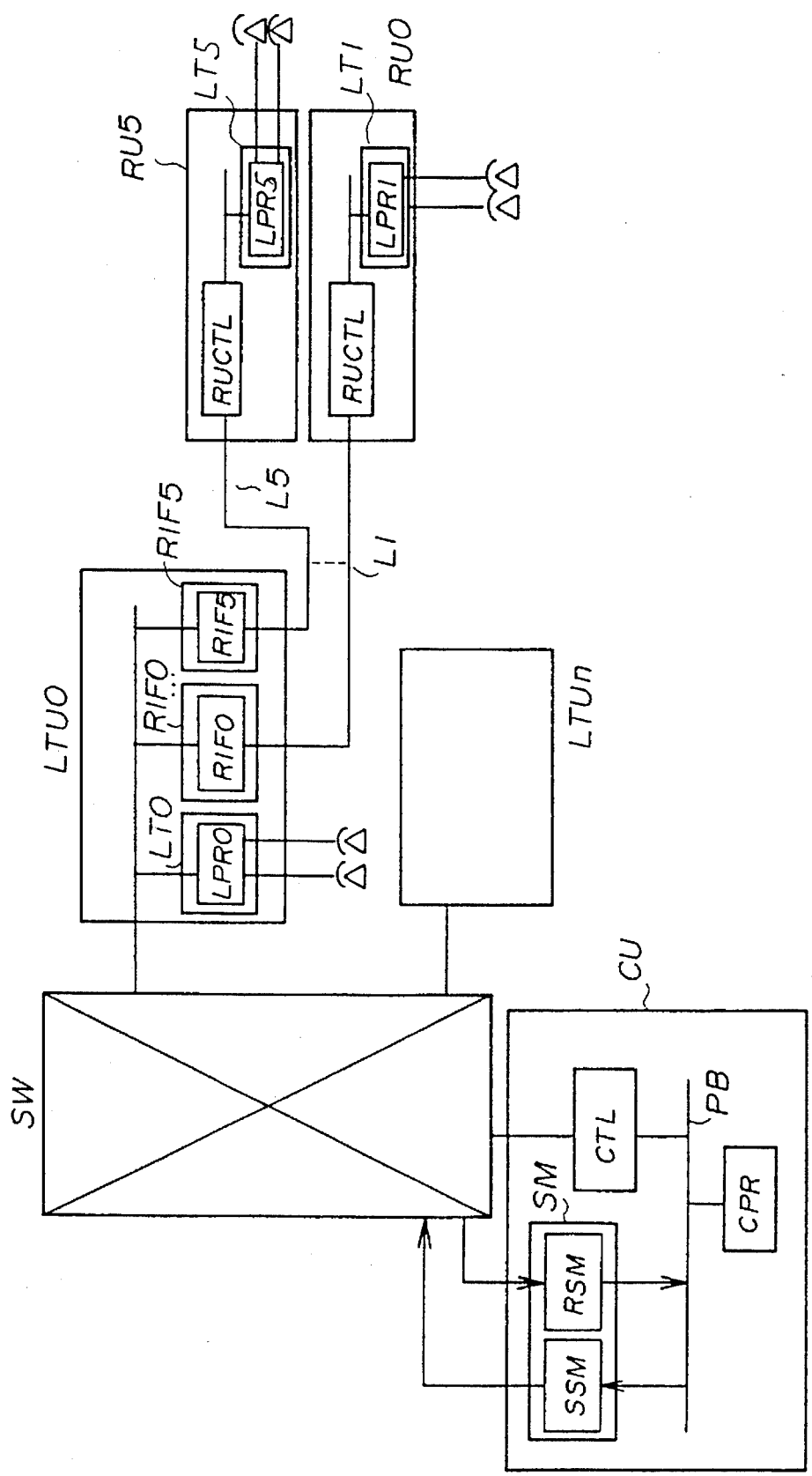
FIG. 7 is a block diagram of an embodiment of the present invention.

FIG. 7 is a block diagram of an embodiment of the present invention. A communications system shown in FIG. 7 includes a digital PBX, and a plurality of remote units RU0–RU5. The digital PBX includes a time division switch SW, a control unit CU, and a plurality of line trunk units LTU0–LTUn. The time division switch SW is configured as shown in FIG. 1. That is, the time division switch SW includes the multiplexer 21, the speech path memory 22 and the demultiplexer 23. The control unit CU includes the call processor CPR, the speech path memory controller CTL and the communications data buffer memory SM.

Figure 3:
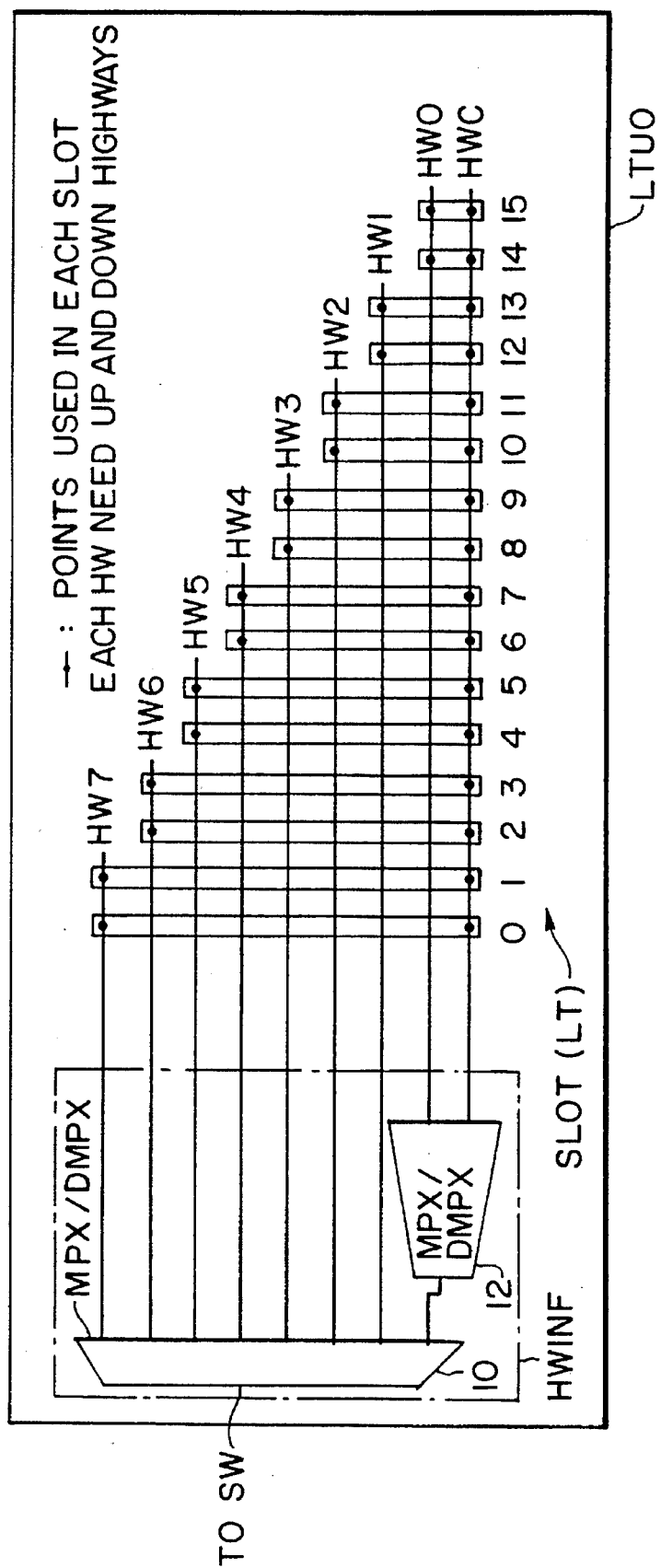
FIG. 3 is a block diagram of the structure of a line trunk unit shown in FIG. 1.
Figure 4:
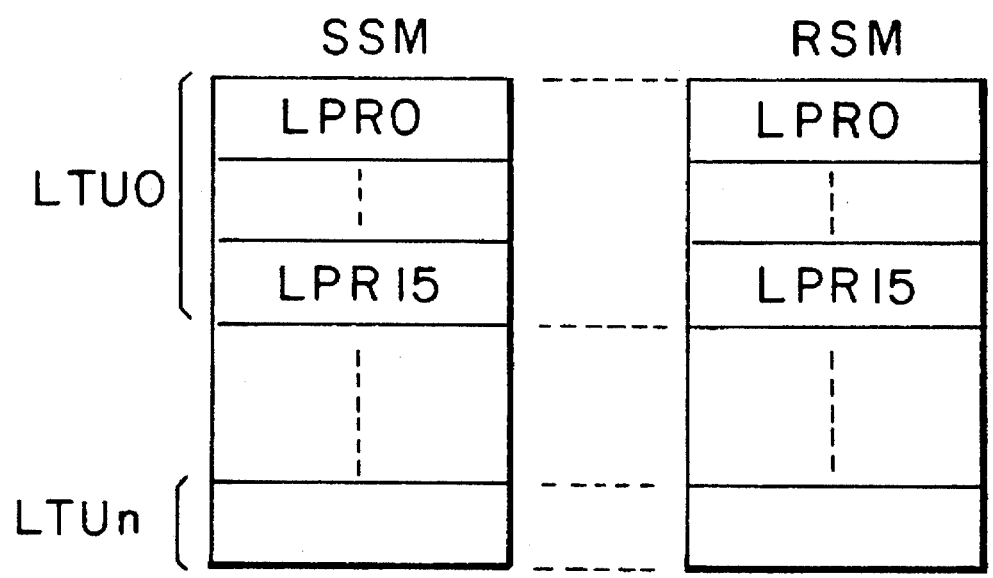
FIG. 4 is a block diagram of the structure of a communications buffer memory shown in FIG. 1.
Figure 5:
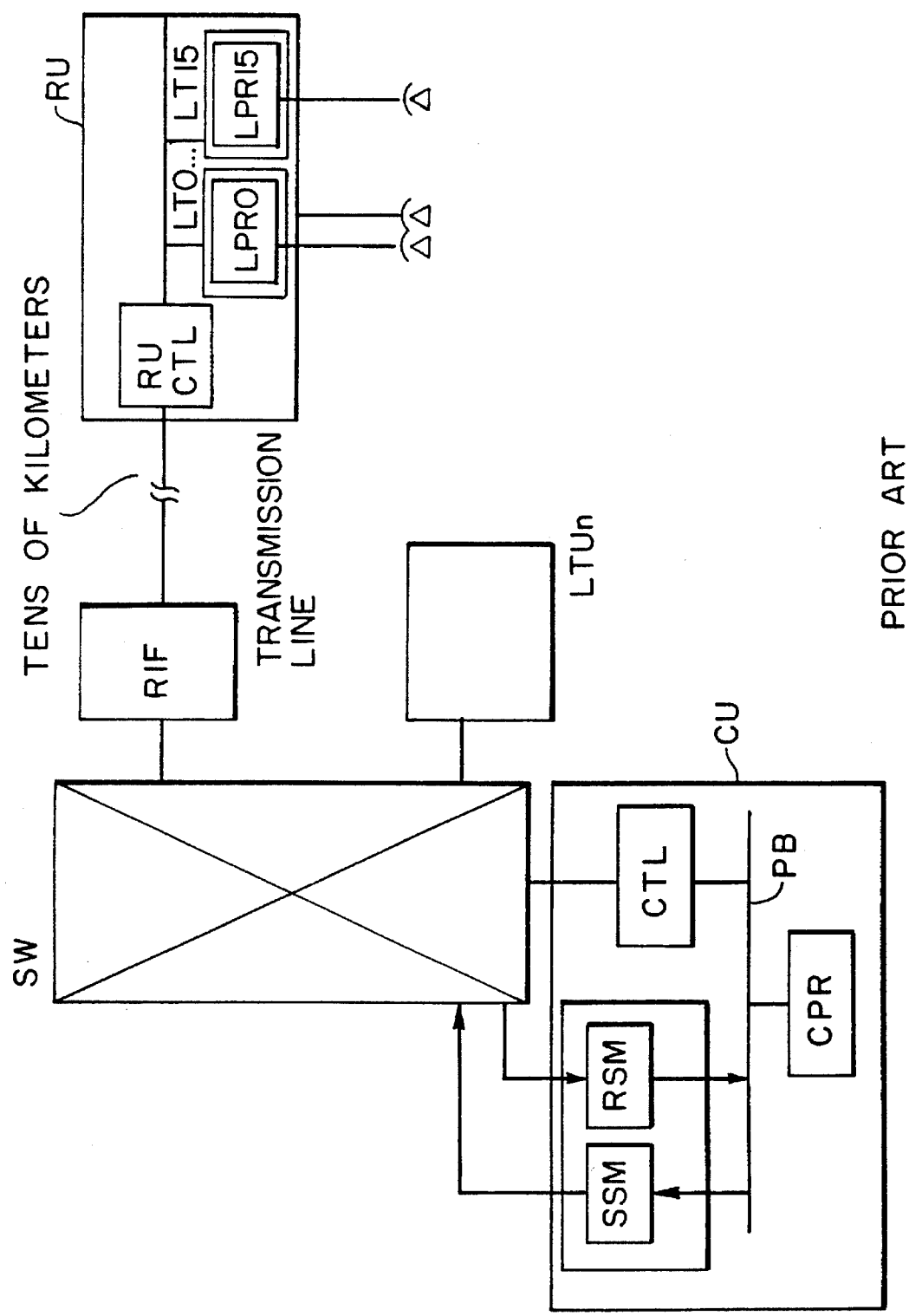
FIG. 5 is a block diagram of a modified communications system based on the communications system using a remote unit.

The line trunk units LTU0–LTUn are connected respectively to the time division switch SW by means of multiplexed highways. Each of the line trunk units LTU0–LTUn is capable of simultaneously processing eight highways, as shown in FIG. 3.

The line trunk unit LTU0 includes a plurality of slots, in which line trunk packages LT and packaged remote interface units RIF can be accommodated. For the sake of convenience, the line trunk unit LTU0 is shown equipped with one line trunk package LT0 and a plurality of remote interface units (only remote interface units RIF1 and RIF5 are depicted).

A plurality of terminals such as telephone sets are connected to the line trunk package LT0. The remote units RU1–RU5 are respectively connected to the remote interface units RIF1–RIF5 via transmission lines L1 through L5. The remote units RU1 and RU5 have line trunk packages LT1 and LT5, respectively. Assuming now that two slots are allotted per highway (the case shown in FIG. 3), each of the remote units RU1–RU5 is capable of accommodating two line trunk packages. The line trunk packages LT1 and LT5 are respectively connected to the transmission lines L1 and L5 via the remote interface controller RUCTL. The line trunk packages LT1 and LT5 accommodating terminals such as telephone sets have line processors LPR1 and LPR5, respectively.

Figure 8:
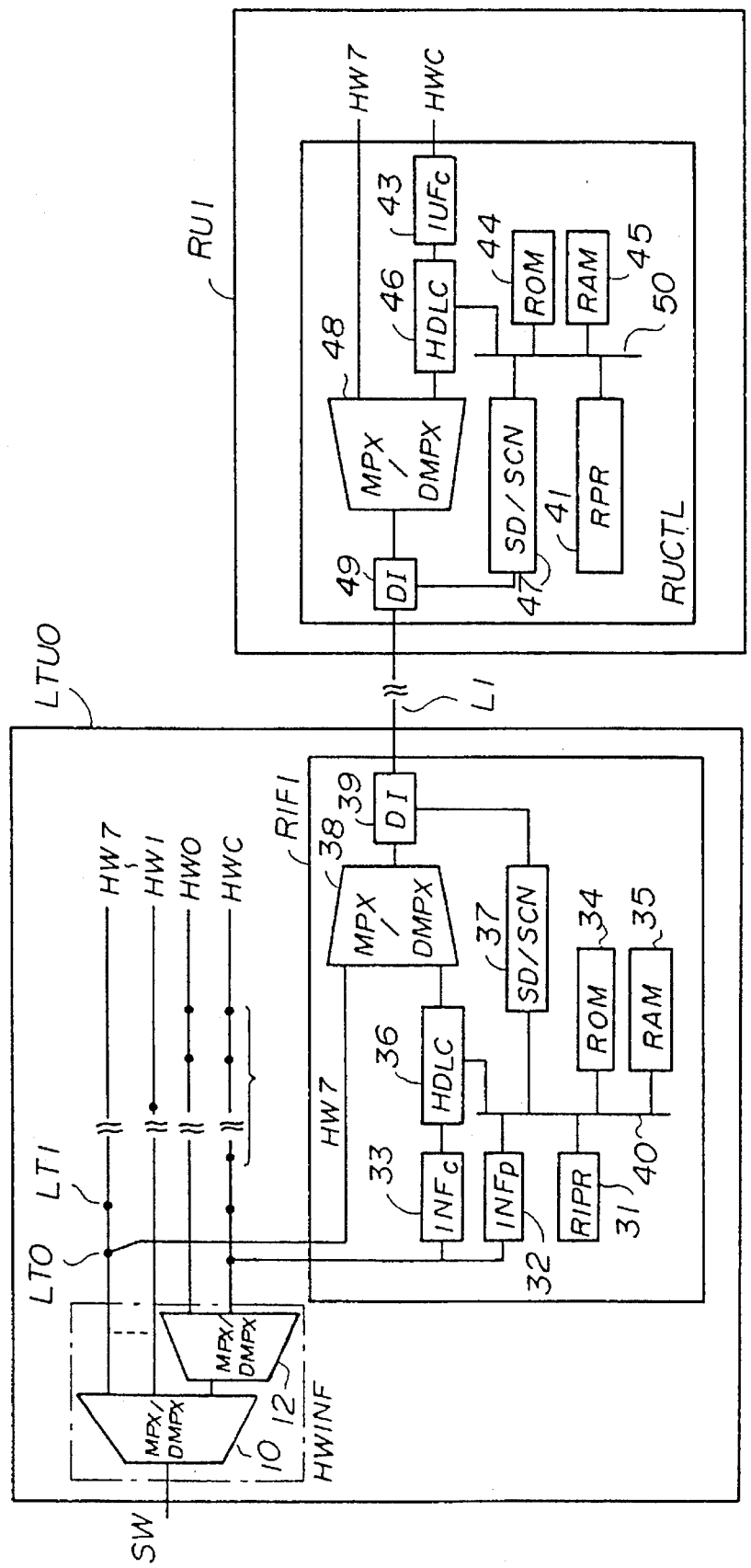
FIG. 8 is a block diagram of the structures of a line trunk unit and a remote unit shown in FIG. 7.
Figure 9:
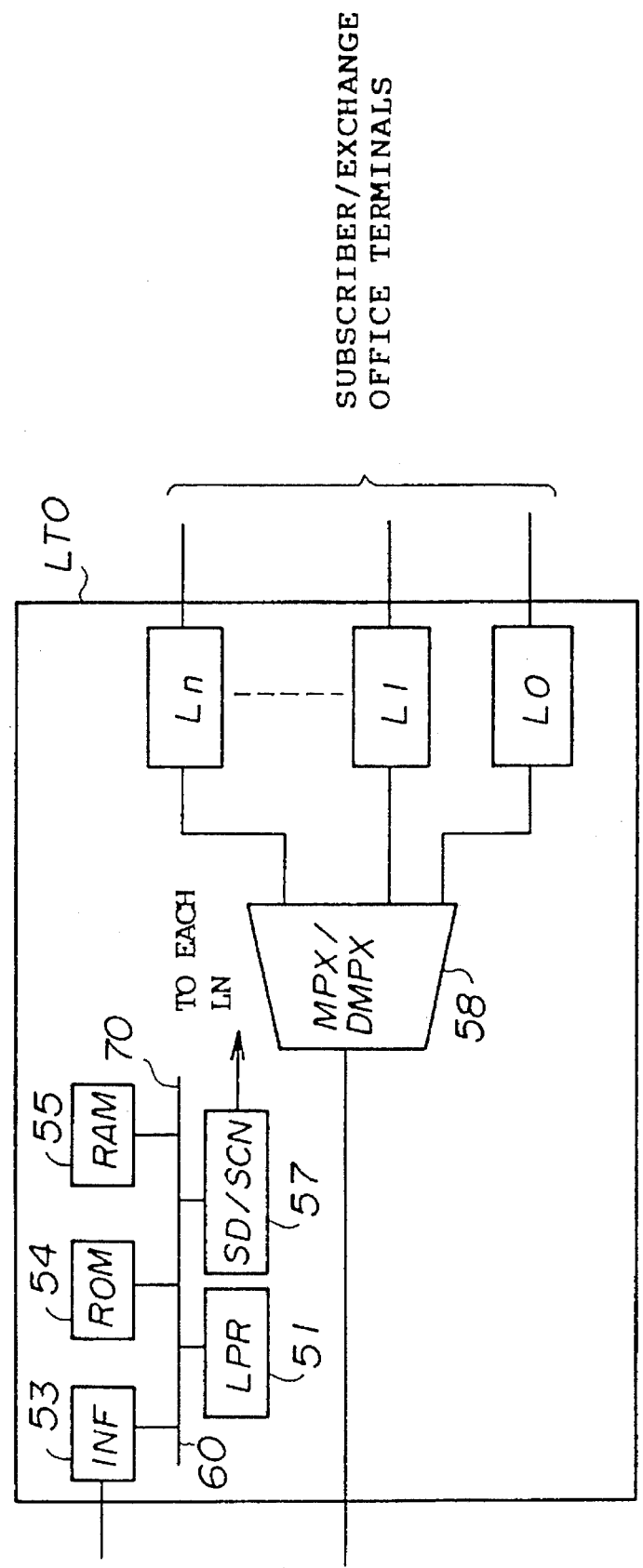
FIG. 9 is a block diagram of a line trunk package accommodated in a line trunk unit shown in FIG. 7.

FIG. 8 is a block diagram of the structures of the line trunk unit LTU0 and the remote unit RU1. FIG. 9 is a block diagram of the structure of the line trunk package LT0 accommodated in the line trunk unit LTU0.

First, a description will now be given, with reference to FIG. 8, of the structure of the line trunk unit LTU0. The line trunk unit LTU0 has the highway interface HWINF, which has been described with reference to FIG. 3. The highway interface HWINF forms an interface between multiplexed highways at the side of the time division switch SW and the highways HW0–HW7 at the side of the transmission lines. Dots shown in FIG. 8 denote contacts of slots LT.

The remote interface unit RIF1 is connected to the speech data highway HW7 and the communications data highway HWC via a slot LT0. The remote interface unit RIF1 includes a remote interface processor (RIPR) 31, communications data buffers 32 (INFp) and 33 (INFc), a ROM 34, a RAM 35, an HDLC (High level Data Link Control) unit 36, a register (SD/SCN) 37, a multiplexer/demultiplexer (MPX/DMPX) 38, a digital interface (DI) 39, and a bus 40.

The multiplexed speed data from the time division switch SW is separated by the multiplexer/demultiplexer 10, and separated pieces of data are output to the highways HW0–HW7. The multiplexer 38 of the remote interface unit RIF1 directly receives the speech data on the highway HW7. The highway HW0 is used to transfer communications data, as has been described previously, and the communications data is written into the buffers 32 and 33. The communications data written into the buffer 33 is sent to the HDLC unit 36, which converts the received communications data into highly reliable data in conformity with the HDLC format. Further, the HDLC unit 36 converts the communications data in the HDLC format received from the transmission line L1 into data transmittable via highways.

In order to perform the HDLC control, the remote interface processor 31 performs, in addition to the control of the transmission line L1, a protocol control corresponding to layer 2 defined in the OSI (Open Systems Interconnection) of the ISO (International Organization for Standardization). The remote interface processor 31 does not operate independently but operates under the control of the call processor CPR as in the case of the line processor LPR. Communications between the call processor CPR and the remote interface processor 31 are performed via the buffer 32 in the same manner as communications between the call processor CPR and the line processor LPR. More particularly, communications data are sent and received via a buffer area (buffer area not used by the line processor LPR) in the communications data buffer memory SM shown in FIG. 7.

The multiplexer 38 performs a multiplexing process for communications data on the highway HW7 and communications data in conformity with the HDLC format and a demultiplexing process which is the reverse of the multiplexing process. The multiplexer/demultiplexer 38 is connected to the transmission line L1 via the digital interface 39. The register 34 is connected to the digital interface 39, and stores control data related to the operation and maintenance of the transmission line L1 and communications with the remote unit processor via the transmission line L1 in order to perform the above operation and maintenance as well as the above communications.

The ROM 34 stores a program describing the operation of the processor 31. The RAM 35 provides a work area for the processor 31.

As shown in FIG. 8, the remote unit RU1 includes a remote unit processor (RPR) 41, a communications buffer (INFc) 43, a ROM 44, a RAM 45, an HDLC unit 46, a register (SD/SCN) 47, a multiplexer/demultiplexer (MPX/DMPX) 48, a digital interface (DI) 49, and a bus 50.

The multiplexer/demultiplexer 48 forms interfaces between data multiplexed on the transmission line L1 and the speech data highway HW7 and between data multiplexed on the transmission line L1 and the communications data highway HWC. The remote unit processor 41 performs the control of the HDLC and the control of the transmission line L1 in a manner similar to that of the remote interface processor 31. The remote unit processor 41 does not operate independently but operates under the control of the remote interface processor 31, which communicates with the remote unit processor 41 by means of communications data transferred via the transmission line L1.

The HDLC unit 46 converts the communications data in conformity with the HDLC format into communications data transmittable via the highway HWC and performs a converting operation reverse to the above operation. The speech data highway HW7 and the communications data highway HWC are connected to the line trunk package LT1 (FIG. 7).

The register 47 is used to perform the operation and maintenance of the transmission line L1 and communications with the remote unit processor via the transmission line L1 as in the case of the aforementioned register 37. The ROM 44 stores a program describing the operation of the processor 41. The RAM 45 provides a work area of the processor 41.

In the case where two slots LT are assigned per highway as shown in FIG. 3, if either the slot LT0 or the slot LT1 connected to the highway HW7 is used, two line trunk packages LT can be accommodated in the remote unit RU1. If remote interface units RIF are accommodated in both the slots LT0 and LT1, each of the remote units RU is capable of accommodating only one line trunk package LT.

FIG. 9 is a block diagram of the structure of the line trunk package LT0 accommodated in the line trunk unit LTU0. The line trunk package shown in FIG. 9 can also be accommodated in the remote unit RU. The line trunk package LT0 includes a line processor (LPR) 51, a communications data buffer (INF) 53, a ROM 54, a RAM 55, a register (SD/SCN) 57, a multiplexer/demultiplexer (MPX/DMPX) 58, and line interfaces L0–Ln.

The multiplexer/demultiplexer 58 is inserted into one of the two slots LT connected to the highway HW1 shown in FIG. 8. The buffer 53 is connected to the communications data highway HWC shown in FIG. 8 in the slot position where the multiplexer/demultiplexer 58 is inserted into one of the two slots LT. The line processor 51 communicates with the call processor CPR shown in FIG. 7 via the communications data highway HWC. If the line trunk package LT0 is accommodated in the remote unit RU, the line processor 51 communicates with the call processor CPR via the processors 31 and 41 shown in FIG. 8. The multiplexer/demultiplexer 58 is connected to terminals or public networks via the line interfaces L0–Ln.

The line processor 51 writes communications data into the buffer 53 and reads the communications data therefrom. The ROM 54 stores a program describing the operation of the line processor 51. The RAM 55 functions as a work area of the line processor 51. The register 57 holds data related to the operation and maintenance of the line interfaces L0–Ln.

A description will now be given of the operation of the embodiment of the present invention.

Figure 10:
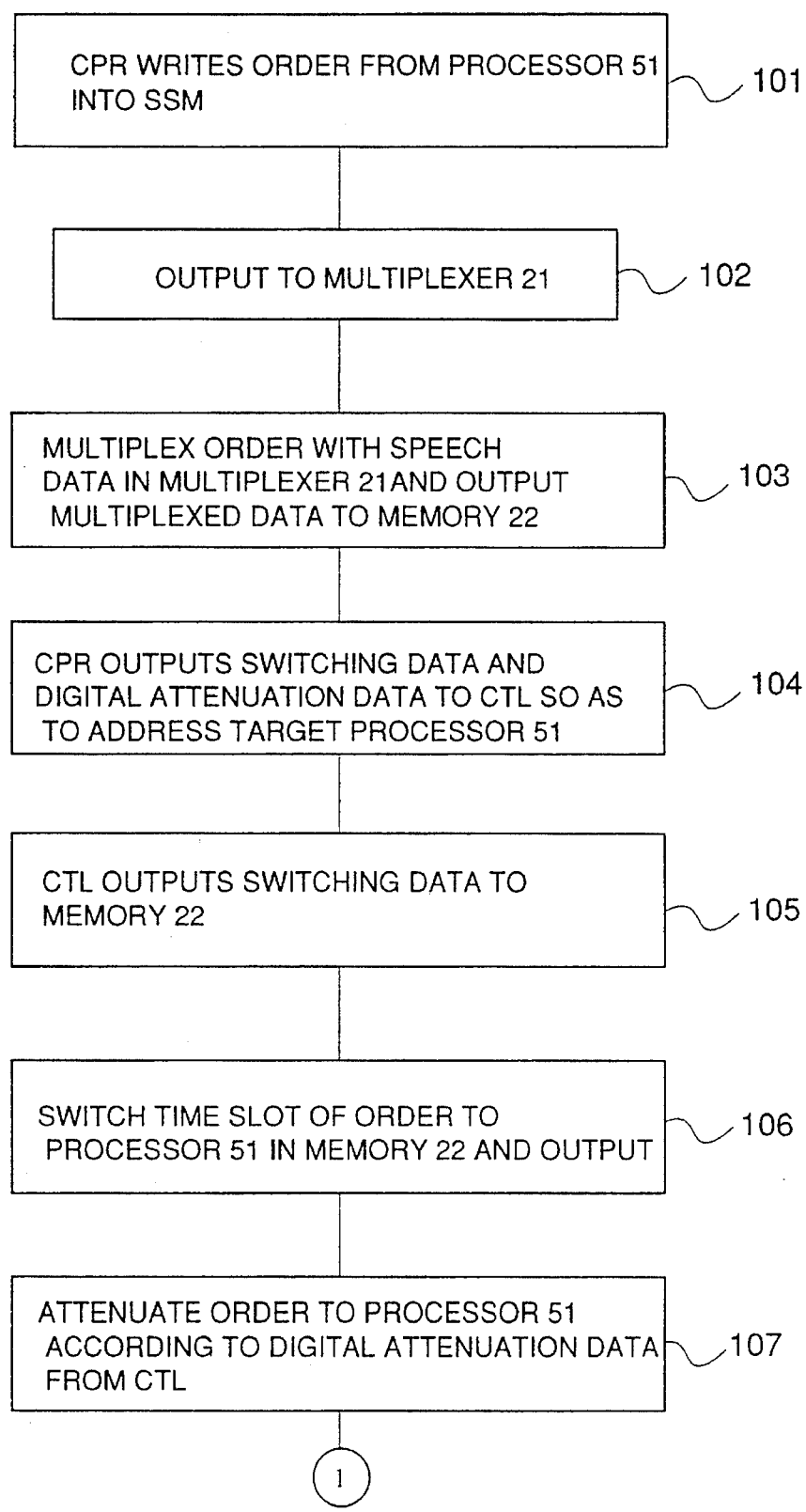
FIGS. 10 and 11 are flowcharts of a communications sequence for performing a communication from a call processor to a line processor of a line trunk package accommodated in a line trunk unit.
Figure 11:
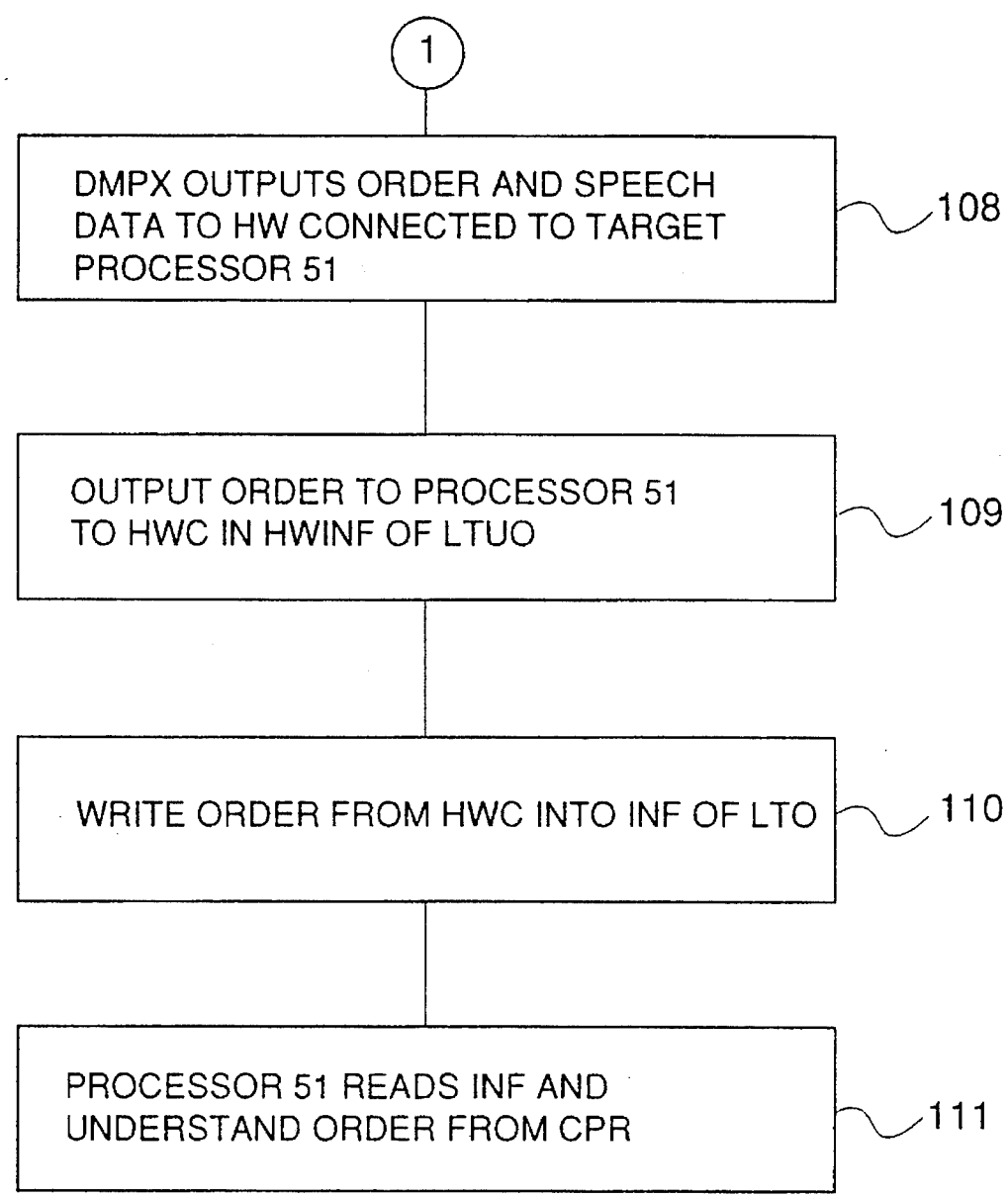

First, a description will be given, with reference to FIGS. 10 and 11, of a transfer of communications data from the call processor CPR (FIG. 7) to the line processor (LPR) 51 (FIG. 9) of the line trunk package LT0 accommodated in the line trunk unit LTU0.

The call processor CPR writes an order or command into a buffer area formed in the send buffer memory SSM and related to the line processor 51 of the line trunk unit LTU0 (step 101). The order is sent to a data line connected to the multiplexer 21 shown in FIG. 1 (step 102). The multiplexer 21 multiplexes the received order (communications data) with speech data, and outputs multiplexed data to the speech path memory 22 (step 103). The call processor CPR writes switching data and digital attenuation data into the speech path memory controller CTL so as to be switched to the target line processor 51 (step 104).

The speech path memory controller CTL outputs, as memory address data, the switching data to the speech path memory 22 (step 105). The speech path memory 22 performs a switching operation so that the order to the line processor 51 is switched from the current time slot to a different time slot (step 106). The order to the line processor 51, the time slot of which has been switched, is attenuated by an adapter (not shown) in response to the digital attenuation data received from the speech path memory controller CTL (step 107). However, the attenuation level with respect to communications data to the line processor LPR is ±0 dB (not attenuated). The demultiplexer 23 simultaneously outputs the order together with speech data to the highway HW connected to the target line processor 51 (step 108 shown in FIG. 11).

The highway interface HWINF (FIG. 8) of the line trunk unit LTU0 outputs the above order among the multiplexed data to the communications data highway HWC of the slot in which the line trunk package LT0 is accommodated (step 109). The output order is written into the buffer (INF) 53 of the line trunk package LT0 (step 110). Then, the line processor 51 reads the order written into the buffer 53, and understands the order from the call processor CPR (step 111).

Next, a description will be given, with reference to FIGS. 12 and 13, of a transfer of communications data from the line processor 51 of the line trunk package LT0 inserted into the line trunk unit LTU0 to the call processor CPR.

Figure 12:
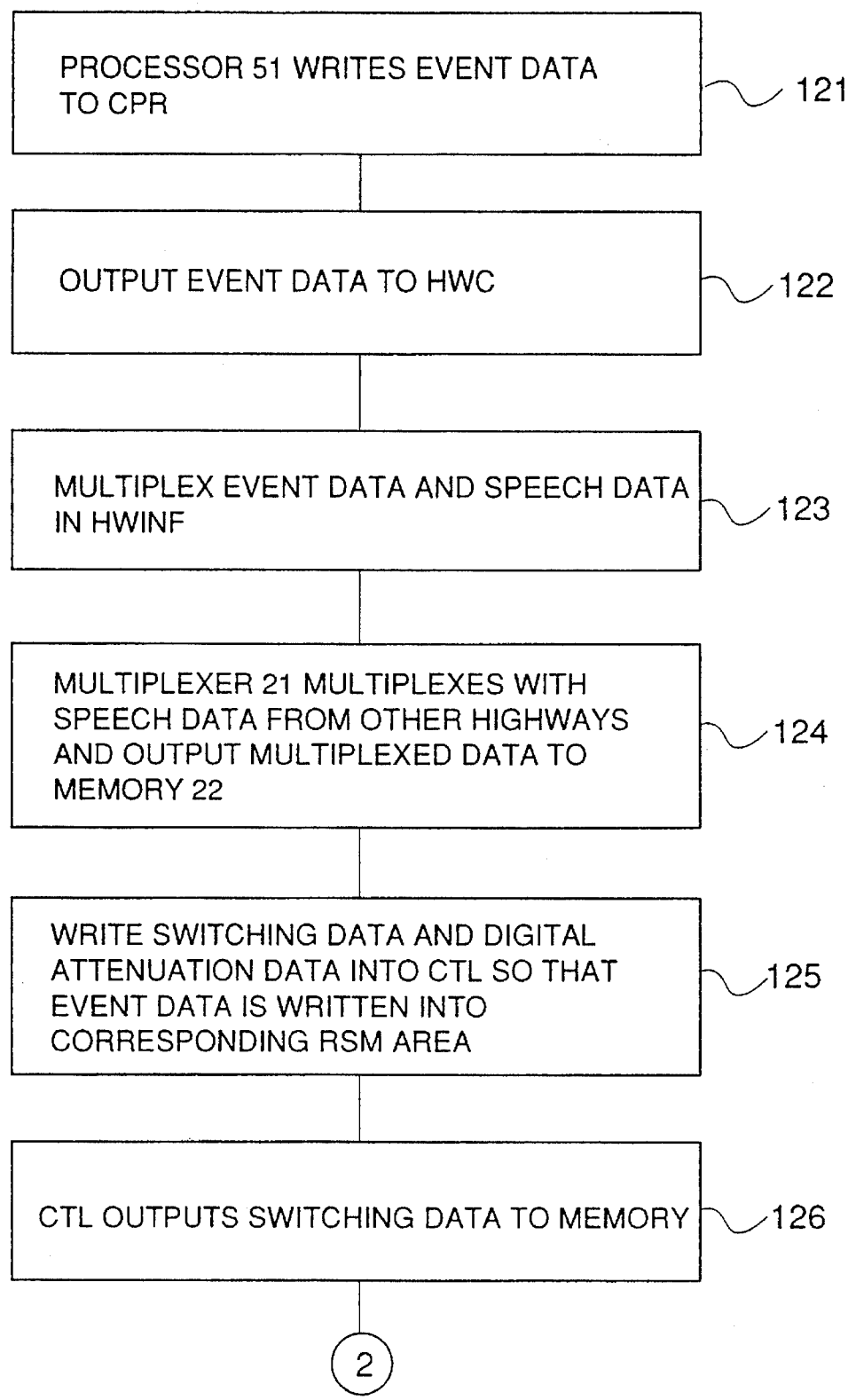
FIGS. 12 and 13 are flowcharts of a communications sequence for performing a communication from the line processor in a line trunk package accommodated in a line trunk unit to the call processor.

First, the line processor 51 writes event data regarding the call processor CPR into the buffer 53 (step 121 shown in FIG. 12). The event data is output to the communications data highway HWC from the buffer 53 (step 122). The highway interface HWINF of the line trunk unit LTU0 multiplexes the received event data with speech data, and outputs multiplexed data to the time division switch SW (step 123).

The multiplexer 21 of the time division switch SW multiplexes the event data with the speech data, and outputs multiplexed data to the speech path memory 22 (step 124). The call processor CPR writes switching data and digital attenuation data into the speech path memory controller CTL so that the event data can be written into a related buffer area of the receive buffer memory RSM (step 125). The speech path memory controller CTL gives, as memory address data, the switching data to the speech path memory 22 (step 126).

Figure 13:
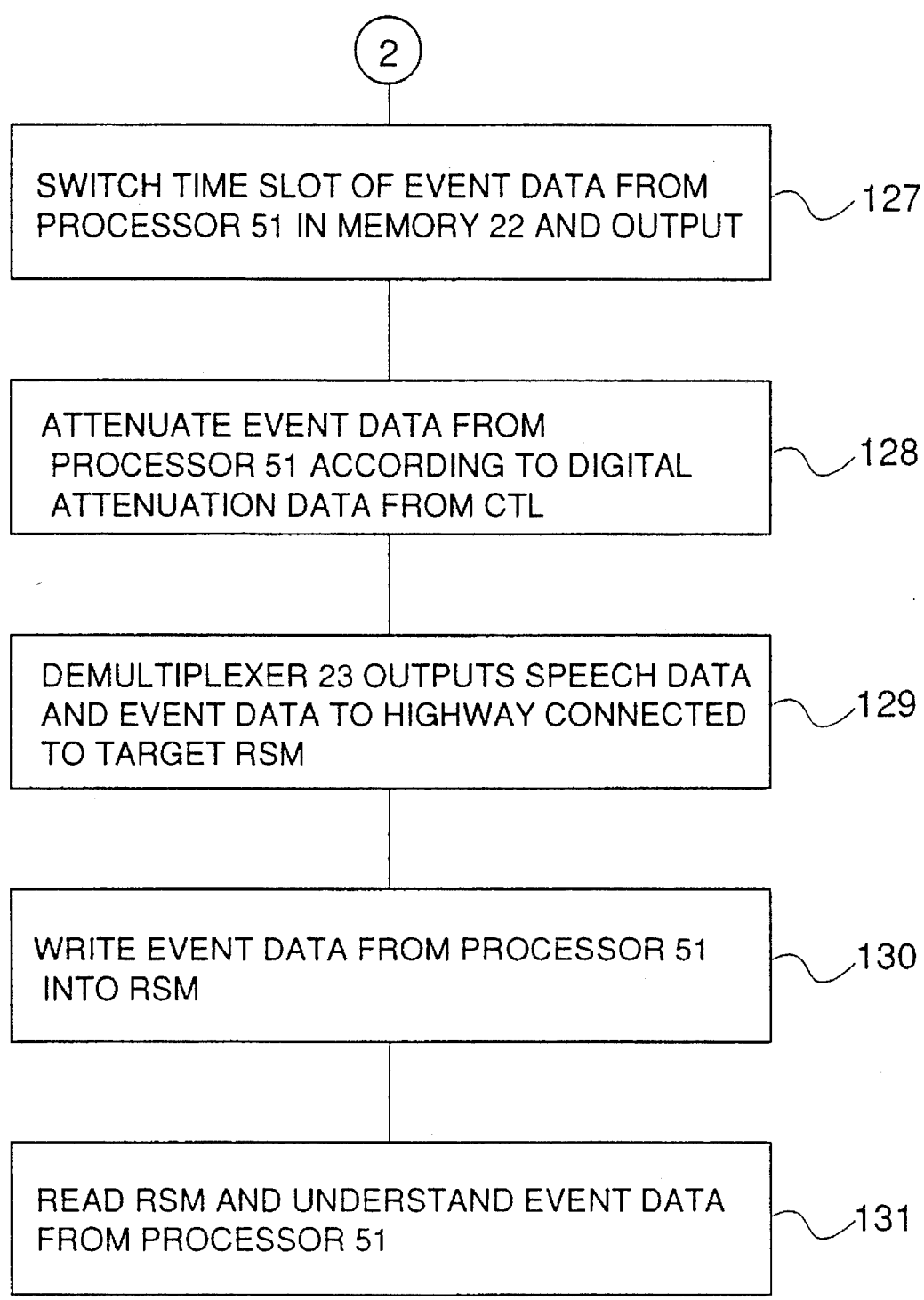

The event data from the line processor 51 is switched in the speech path memory 22 from the current time slot to a different time slot, and is then read from the speech path memory 22 (step 127 shown in FIG. 13). The adapter attenuates the event data from the line processor 51 in accordance with the digital attenuation data from the speech path memory controller CTL (step 128). However, in this case, the event data is not attenuated. The demultiplexer 23 simultaneously outputs, together with the speech data, the event data to the highway to which the target receive buffer memory RSM is connected (step 129). The call processor CPR accesses the receive buffer memory, and knows the event data from the line processor 51 (step 131).

Figure 14:
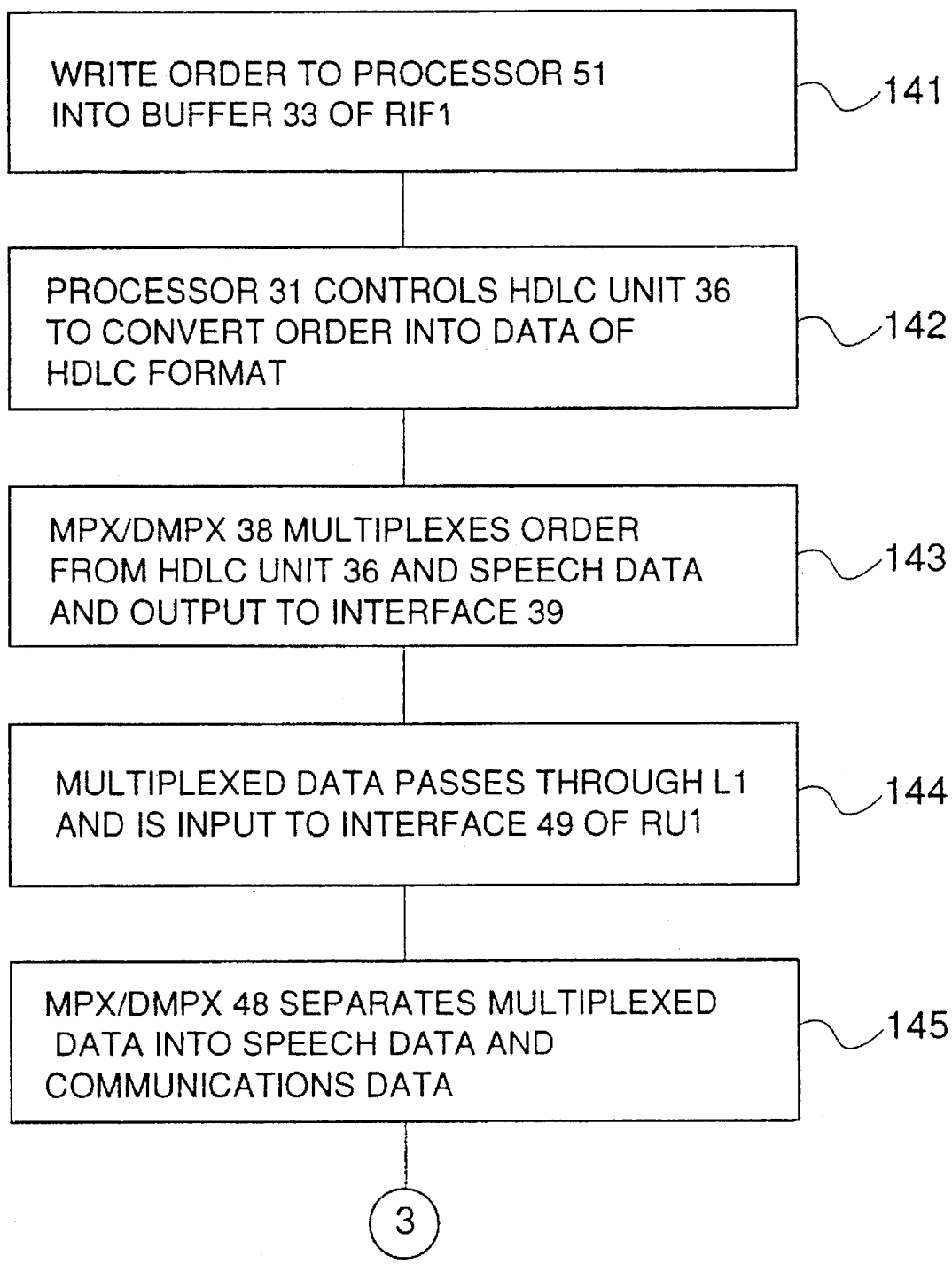
FIGS. 14 and 15 are flowcharts of a communications sequence for performing a communication from the call processor to the line processor in the remote unit via a remote interface unit accommodated in the line trunk unit.
Figure 15:
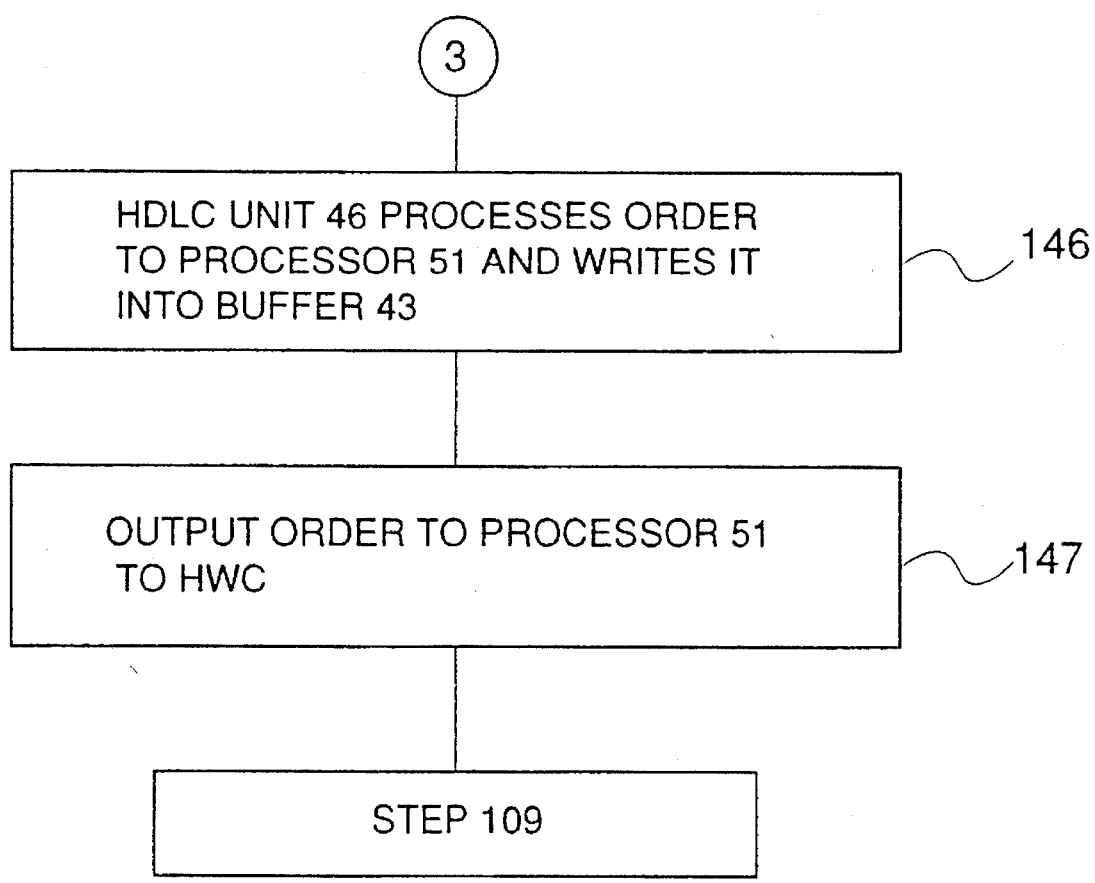

A description will now be given, with reference to FIGS. 14 and 15, of a transfer of communications data from the call processor CPR to the line processor LPR 51 of the line trunk unit LT0 (FIG. 9) accommodated in the remote unit RU1 via the remote interface unit RIF1 accommodated in the line trunk unit LTU0 and the transmission line L1.

At the commencement of the above transfer, the aforementioned steps 101 through 108 are sequentially carried out. An order from the time division switch SW is written into the buffer 33 of the remote interface unit RIF1 (step 141). The remote interface processor 31 of the remote interface unit RIF1 controls the HDLC unit 36, and converts the order addressed to the line processor 51 to data in conformity with the HDLC format (step 142). The multiplexer/demultiplexer 38 multiplexes data of the order having the HDLC format with speech data, and outputs multiplexed data to the digital interface 39 (step 143). Then, the multiplexed data is transferred via the transmission line L1, and is input to the digital interface 49 of the remote unit controller RUCTL of the remote unit RU1 (step 144).

The multiplexer/demultiplexer 48 receives the multiplexed data from the digital interface 49, and separates the speech data and the communications data from each other (step 145). The order which is communications data conforming to the HDLC format is converted into order data suitable for the communications data highway HWC by the HDLC unit 46 under the control of the remote unit processor 41, and the converted order data is written into the buffer 43 connected to the communications data highway HWC (step 146). Then, the order is read from the buffer 43 and is output to the communications data highway HWC (step 147). The operation subsequent to step 147 is performed in the same manner as that defined by the steps 109 through 111 shown in FIG. 11.

Figure 16:
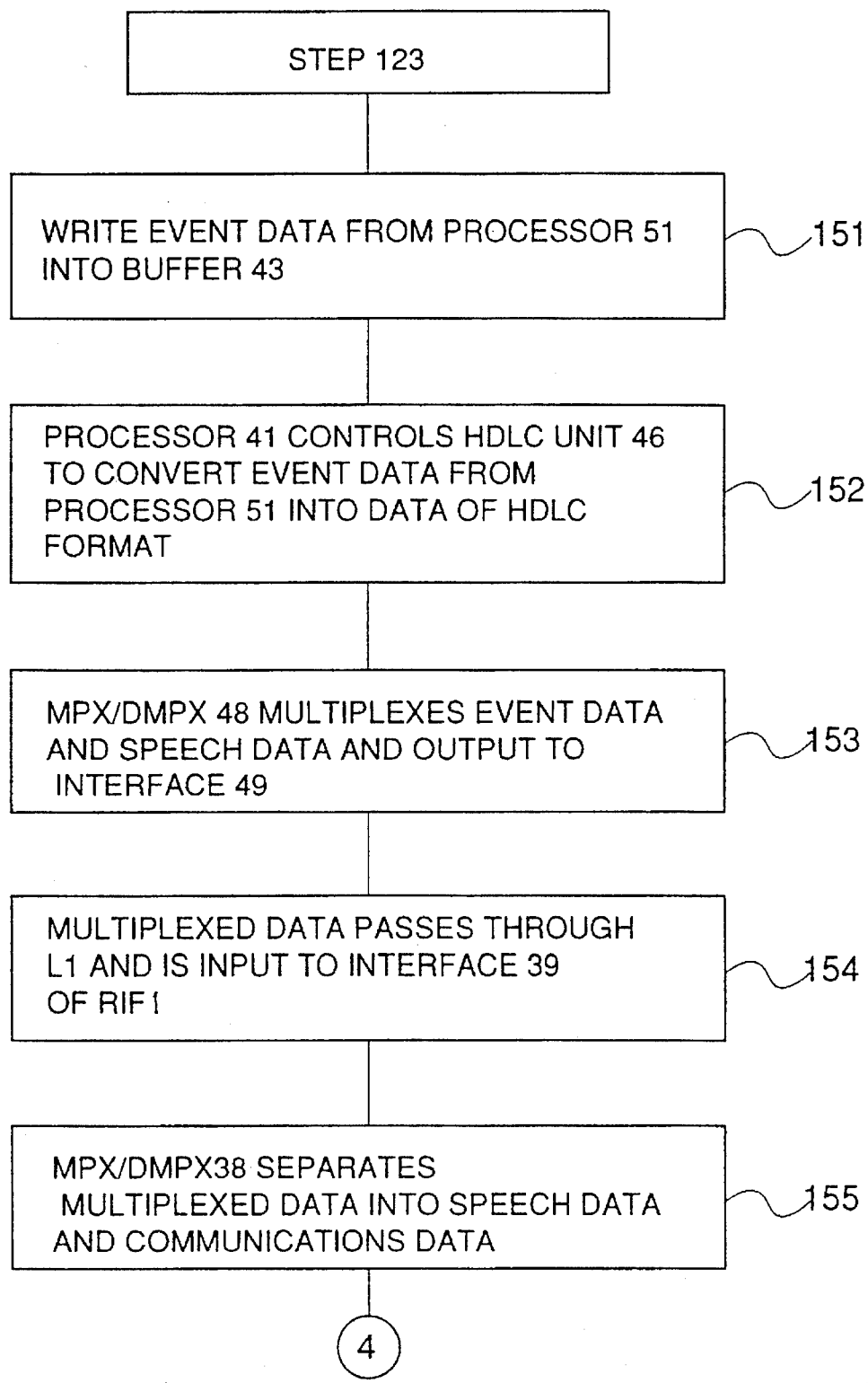
FIGS. 16 and 17 are flowcharts of a communications sequence for performing a communication from the line processor in the remote unit to the call processor via the remote interface unit accommodated in the line trunk unit.
Figure 17:
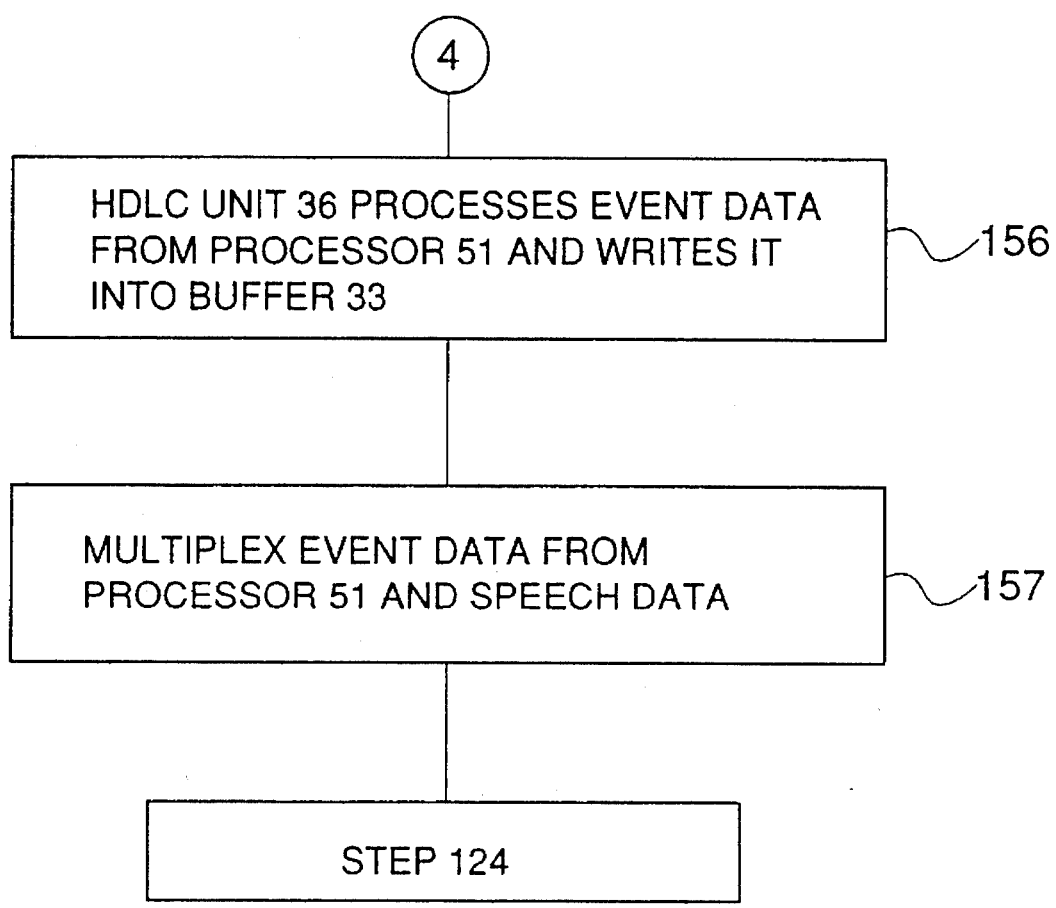

A description will now be given, with reference to FIGS. 16 and 17, of a transfer of the event data from the line processor 51 of the line trunk package LT0 accommodated in the remote unit RU1 to the call processor CPR of the digital PBX via the transmission line L1 and the remote interface unit RIF1.

At the commencement of the above transfer, steps 121 through 123 shown in FIG. 12 are carried out. Next, the event data from the line processor 51 is written into the buffer 43 (step 151). The remote unit processor 41 controls the HDLC unit 46, and converts the event data stored in the buffer 43 into event data conforming to the HDLC format (step 152). The multiplexer/demultiplexer 48 multiplexes the event data from the HDLC unit 46 with speech data, and outputs multiplexed data to the digital interface 49 (step 153).

The multiplexed data from the buffer 49 is sent over the transmission line L1, and is written into the buffer 39 of the remote interface unit RIF1 (step 154). The multiplexer/demultiplexer 38 separates the multiplexed data received from the buffer 39 into the speech data and the communications data (step 155). The event data which is communications data is converted into event data suitable for the communications data highway HWC by the HDLC unit 36 under the control of the remote interface processor 31, and the converted event data is written into the buffer (step 156). The highway interface HWINF multiplexes the event data from the buffer 33 and the speech data (step 157). The step subsequent to step 157 is step 124 shown in FIG. 12.

Figure 18:
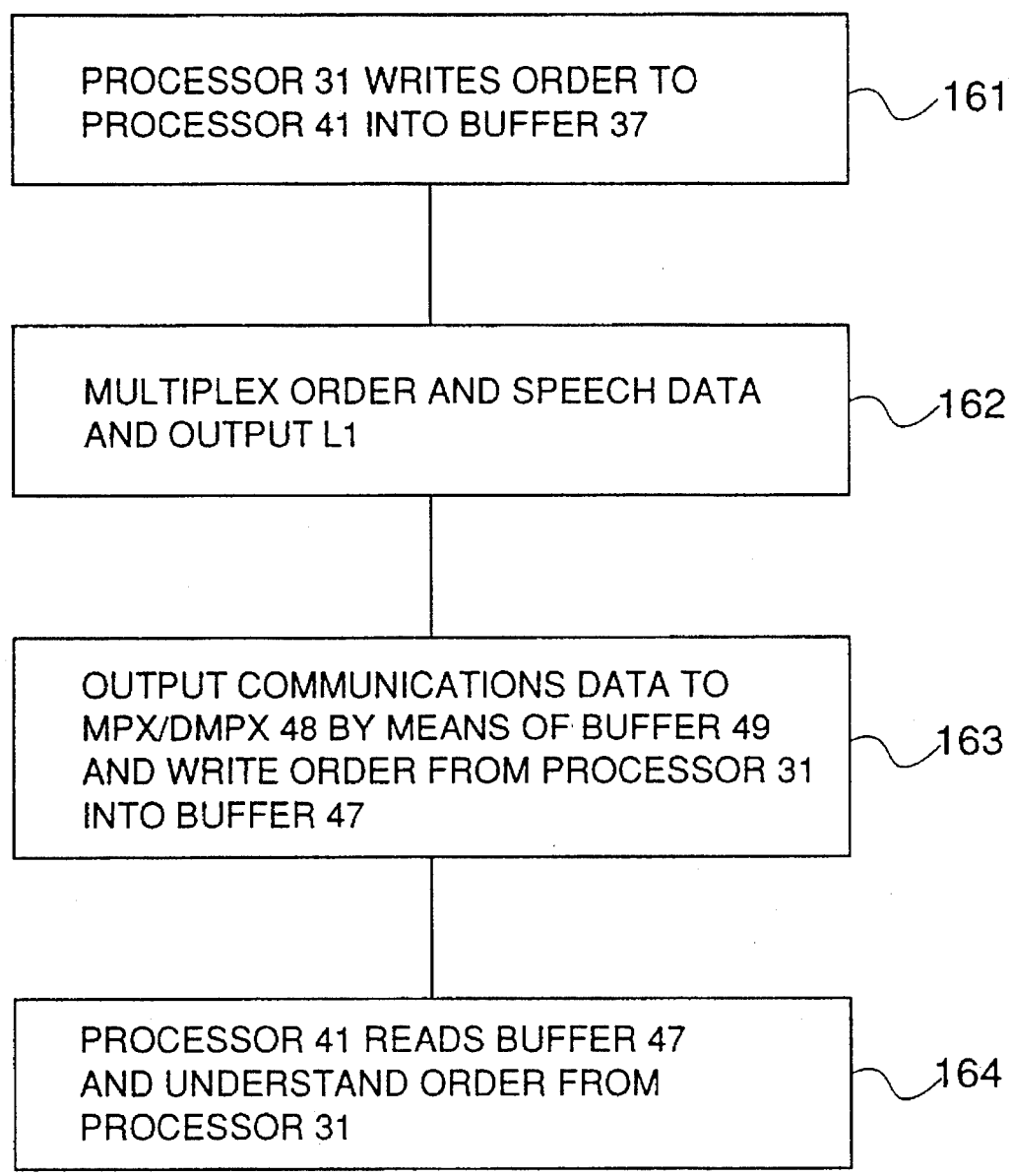
FIG. 18 is a flowchart of a communications sequence for performing a communication from the remote interface processor in the remote interface unit to the remote unit processor in the remote unit.

A description will now be given, with reference to FIG. 18, of a transfer of communications data from the remote interface processor 31 to the remote unit processor 41.

First, an order from the remote interface processor 31 to the remote unit processor 41 is written into the buffer (SD/SCN) 37 (step 161). Next, by means of the buffer 39, the above order is multiplexed with speech data and communications data from the call processor CPR to the line processor 51, and multiplexed data is output to the transmission line L1 (step 162). The speech data and the communications data from the call processor CPR to the line processor 51 are read from the buffer 49 of the remote unit RU1 and output to the multiplexer/demultiplexer 48, which writes the order from the remote interface processor 31 into the buffer 47 (step 163). The remote processor 41 reads the buffer 47, and understands the order from the remote interface processor 31 (step 164).

Figure 19:
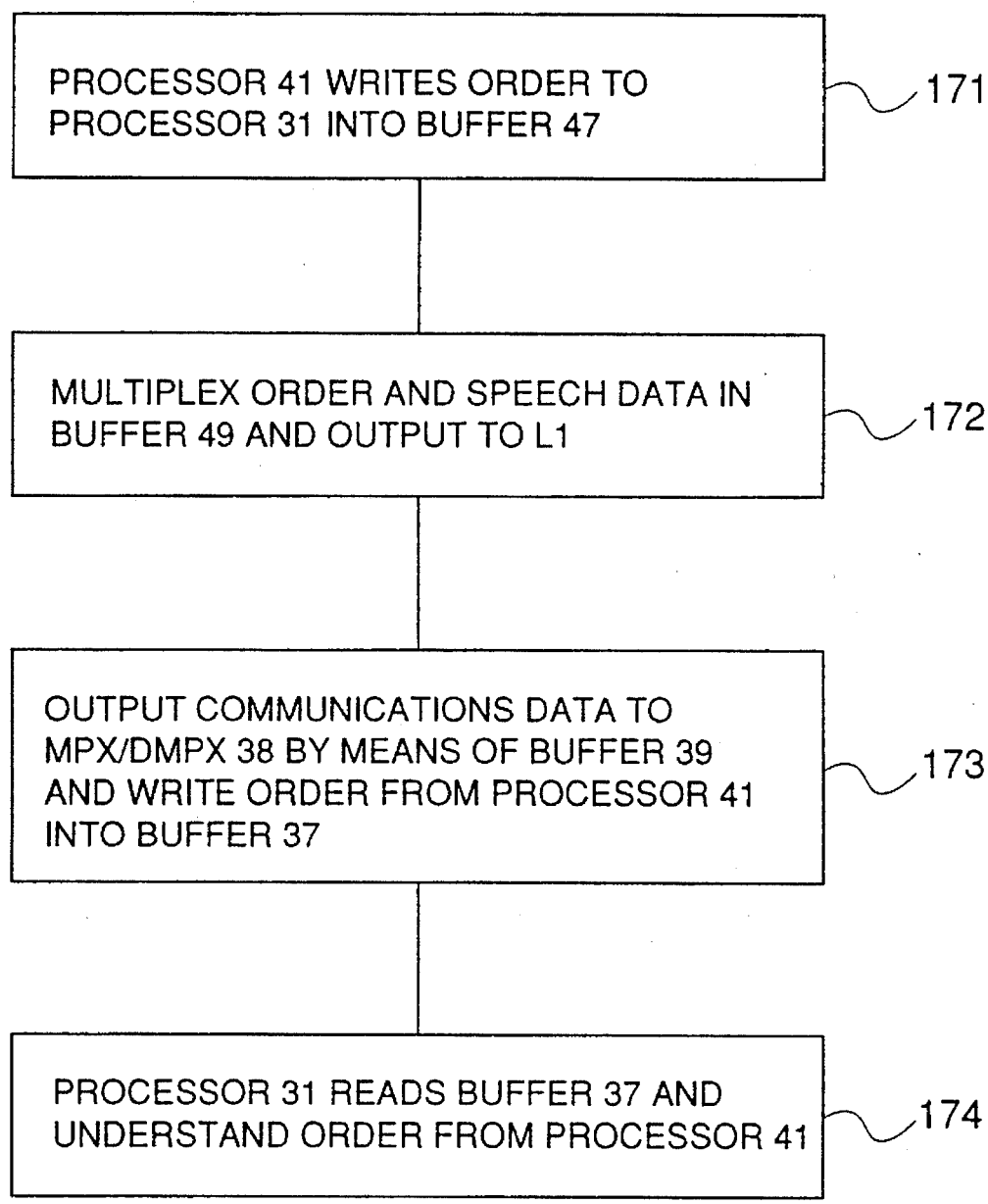
FIG. 19 is a flowchart of a communications sequence for performing a communication from the remote unit processor in the remote unit to the remote interface processor in the remote interface unit.

A description will now be given, with reference to FIG. 19, of a transfer of communications data from the remote unit processor 41 to the remote interface processor 31.

The remote unit processor 41 writes the event data addressed to the remote interface processor 31 into the buffer 47 (step 171). Next, the event data is multiplexed with speech data and communications data from the line processor 51 to the call processor CPR by means of the buffer 47, and multiplexed data is output to the transmission line L1 (step 172). The speech data and the communications data from the line processor 51 to the call processor CPR are read from the buffer 39 of the remote interface unit RIF1, and the event data from the remote unit 41 is written into the buffer 37 (step 173). The remote interface processor 31 reads the buffer 37, and understands the event from the remote unit processor 41 (step 174).

The explanation of the embodiment of the present invention is completed. In the line trunk units LTU, the remote interface processors RIPR can be handled in the same manner as the line processors LPR conventionally used. Hence, it is possible to accommodate the line processors LPR and remote interface processors RIPR within one line trunk unit LTU. Hence, even if the line trunk unit allowed to handle only a fixed number of highways is used, control can be performed for individual highways, and the highways and structural parts of the system can be efficiently utilized. Further, a remote interface unit can be provided for each highway, and hence a compact remote unit can be placed in a remote point.

The transmission lines L1–L5 can be configured by means of various interfaces. For example, it is possible to use long-distance transmission lines by using digital dedicated (leased) lines.

The present invention is not limited to the specifically disclosed embodiments, and variations and modifications may be made without departing from the scope of the present invention.

What is claimed is:

1. A line trunk unit which is connected to a digital private branch exchange and can accommodate lines connectable to communications terminals or a network, said line trunk unit comprising:
    first interface means for establishing an interface between a multiplexed highway coupled to the digital private branch exchange and a predetermined number of demultiplexed highways in the line trunk unit; and
    second interface means for communicating with a remote unit accommodating a communications terminal via a transmission line and for communicating with a control unit of the digital private branch exchange via at least one of said demultiplexed highways, said control unit controlling a switch of the digital private branch exchange.

2. The line trunk unit as claimed in claim 1, further comprising communicating means for communicating with the control unit of the digital private branch exchange via at least one of said demultiplexed highways and for communicating with the communications terminals or the network via said lines.

3. The line trunk unit as claimed in claim 1, wherein said second interface means comprises processor means for controlling a communication with the remote unit and a communication with the control unit of the digital private branch exchange via at least one of the demultiplexed highways.

4. The line trunk unit as claimed in claim 2, wherein:
    said second interface means comprises first processor means for controlling a communication with the remote unit and a communication with the control unit of the digital private branch exchange via at least one of the demultiplexed highways; and
    said communicating means comprises second processor means for controlling a communication via at least one of the demultiplexed highways and a communication with the communications terminals or the network via said lines.

5. The line trunk unit as claimed in claim 1, wherein said second interface means comprises converting means for converting a data format between data transmitted via at least one of the demultiplexed highways and data transmitted via said transmission line.

6. The line trunk unit as claimed in claim 1, wherein said transmission line comprises a digital transmission line.

7. A digital private branch exchange comprising:
    switch means for switching time slots on multiplexed highways for transmitting multiplexed data;
    line trunk units which are connected to the multiplexed highways and can accommodate lines connectable to terminals or a network; and
    control means for controlling communications with the line trunk units,
    at least one of the line trunk units comprising:
        first interface means, connected to one of the multiplexed highways, for establishing an interface between said one of the multiplexed highways and a predetermined number of demultiplexed highways in said one of the line trunk units; and
        second interface means for communicating with a remote unit accommodating a communications terminal via a transmission line and for communicating with a control unit of the digital private branch exchange via at least one of said demultiplexed highways, said control unit controlling a switch of the digital private branch exchange.

8. The digital private branch exchange as claimed in claim 7, further comprising communicating means for communicating with the control unit via at least one of said demultiplexed highways within said one of the line trunk units and for communicating with the communications terminals or the network via said lines.

9. The digital private branch exchange as claimed in claim 7, wherein said second interface means comprises processor means for controlling a communication with the remote unit and a communication with the control unit via at least one of the demultiplexed highways in said one of the demultiplexed highways.

10. The digital private branch exchange as claimed in claim 8, wherein:

said second interface means comprises first processor means for controlling a communication with the remote unit and a communication with the control unit via at least one of the demultiplexed highways; and said communicating means comprises second processor means for controlling a communication via at least one of the demultiplexed highways and a communication with the communications terminals or the network via said lines.

11. The digital private branch exchange as claimed in claim 7, wherein said second interface means comprises converting means for converting a data format between data transmitted via at least one of the demultiplexed highways and data transmitted via said transmission line.

12. The digital private branch exchange as claimed in claim 7, wherein said transmission line comprises a digital transmission line.

13. A communications system comprising:

a network; and a digital private branch exchange, said digital private branch exchange comprising:

switch means for switching time slots on multiplexed highways for transmitting multiplexed data;

line trunk units which are connected to the multiplexed highways and can accommodate lines connectable to terminals or the network; and control means for controlling communications with the line trunk units, at least one of the line trunk units comprising:

first interface means, connected to one of the multiplexed highways, for establishing an interface between said one of the multiplexed highways and a predetermined number of demultiplexed highways in said one of the line trunk units; and second interface means for communicating with a remote unit accommodating a communications terminal via a transmission line and for communicating with a control unit of the digital private branch exchange via at least one of said demultiplexed highways, said control unit controlling a switch of the digital private branch exchange.

14. The communications system as claimed in claim 13, further comprising communicating means for communicating with the control unit via at least one of said demultiplexed highways within said one of the line trunk units and for communicating with the communications terminals or the network via said lines.

15. The communications system as claimed in claim 13, wherein said second interface means comprises processor means for controlling a communication with the remote unit and a communication with the control unit via at least one of the demultiplexed highways in said one of the demultiplexed highways.

16. The communications system as claimed in claim 14, wherein:

said second interface means comprises first processor means for controlling a communication with the remote unit and a communication with the control unit via at least one of the demultiplexed highways; and said communicating means comprises second processor means for controlling a communication via at least one of the demultiplexed highways and a communication with the communications terminals or the network via said lines.

17. The communications system as claimed in claim 13, wherein said second interface means comprises converting means for converting a data format between data transmitted via at least one of the demultiplexed highways and data transmitted via said transmission line.

18. The communications system as claimed in claim 13, wherein said transmission line comprises a digital transmission line.

* * * * *